United States Patent
Roberts et al.

(10) Patent No.: US 6,687,464 B1
(45) Date of Patent: Feb. 3, 2004

(54) OPTIMIZATION OF A COMMUNICATIONS SYSTEM BASED ON IDENTIFICATION OF AN OPTICAL MEDIUM

(75) Inventors: Kim B. Roberts, Nepean (CA); Maurice S. O'Sullivan, Ottawa (CA); Paul A. Warren, Nepean (CA); Les C. Chan, Nepean (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/481,691

(22) Filed: Jan. 12, 2000

(30) Foreign Application Priority Data

Dec. 30, 1999 (CA) .............................................. 2294555

(51) Int. Cl.⁷ .............................................. H04B 10/08
(52) U.S. Cl. .............................. 398/158; 398/9; 398/25; 398/28
(58) Field of Search ................................. 359/110, 154, 359/161, 169, 173, 152; 356/73.1; 398/9, 13, 25, 28, 140, 158, 169, 141

(56) References Cited

U.S. PATENT DOCUMENTS

| | | | | |
|---|---|---|---|---|
| 5,416,623 A | * | 5/1995 | Dawson et al. | 359/110 |
| 5,442,434 A | * | 8/1995 | Liao et al. | 356/73.1 |
| 5,790,285 A | * | 8/1998 | Mock | 356/110 |
| 5,969,840 A | | 10/1999 | Roberts | 359/161 |
| 6,011,623 A | * | 1/2000 | MacDonald et al. | 356/519 |
| 6,154,273 A | * | 11/2000 | Suzuki | 356/73.1 |
| 6,269,204 B1 | * | 7/2001 | Ishikawa | 385/24 |

FOREIGN PATENT DOCUMENTS

| | | | |
|---|---|---|---|
| CA | 2207126 | 12/1997 | H04B/10/18 |
| GB | 2292495 | 2/1996 | G01M/11/00 |

OTHER PUBLICATIONS

Journal of Lightwave Technology, vol. 7, No. 8, Aug. 1989—"Advances in Optical Time–Domain Reflectometry" (Mitsuhiro Tateda and Tsuneo Horiguchi).

* cited by examiner

Primary Examiner—Leslie Pascal
Assistant Examiner—Dalzid Singh
(74) Attorney, Agent, or Firm—Kent Daniels Ogilvy Renault (57) ABSTRACT

An optical communications system is adapted for connection to an optical fiber link of an optical communications network. The system obtains a fiber identifier respecting the optical fiber link; a respective optimum setting of one or more parameters of the optical communications system; and adjusts a respective value of each parameter in accordance with the respective optimum setting. The fiber identifier can be obtained from a value of at least one fiber transmission property of the optical fiber link. The fiber transmission property value is used to search a look-up table of class definitions, each class definition including a respective class identifier and at least one corresponding characteristic transmission property value. A class identifier is selected as the fiber identifier from the class definition for which each characteristic transmission property value most closely matches a corresponding fiber transmission property value. Each class definition may also include an optimum setting for each parameter.

66 Claims, 6 Drawing Sheets

OPTIMIZATION OF A COMMUNICATIONS SYSTEM BASED ON IDENTIFICATION OF AN OPTICAL MEDIUM

CROSS-REFERENCE TO RELATED APPLICATIONS

This application claims priority from Applicant's co-pending Canadian Patent Application No. 2,294,555, filed on Dec. 30, 1999, and entitled "Optimization of a Communications System Based on Identification of an Optical Medium".

MICROFICHE APPENDIX

Not Applicable.

TECHNICAL FIELD

The present invention relates to high-speed data communications systems and in particular to optimization of a data communications system based on identification of optical fiber media connected to the data communications system.

BACKGROUND OF THE INVENTION

It is well known that optical signals are degraded between a transmitter and a receiver of a data communications network, due, at least in part, to signal corruption introduced by the optical fiber medium linking the nodes of the network. Commonly referred to as "channel effect", this signal corruption is normally attributable to such phenomena as attenuation and dispersion. Channel effects are influenced by such factors as manufacturing methodology, material composition and physical properties of the fiber medium, and thus commonly vary from one manufacturer to another, and even between production runs by the same manufacturer.

Attenuation is the loss of signal intensity as the light propagates through the fiber medium, and is also known as fiber-loss. Attenuation is generally an effect of the bulk properties of the fiber (nominally, its "transparency"), and may exhibit some wavelength-dependency.

Dispersion is the chromatic or wavelength dependence of a speed of travel of light through a fiber. Dispersion produces signal distortion resulting from different wavelengths of light within a pulse travelling at different speeds through the fiber medium. Signal distortion may also be caused by some parts of a light pulse following longer paths (modes) than others. Most fiber media transmit at least one wavelength (or band of wavelengths) for which little or no dispersion. Optical signals at frequencies outside this minimal-dispersion band are subject to at least some dispersion.

The total amount of attenuation and dispersion that occurs within a fiber communications link, for any particular wavelength, varies with a length of the link. Thus it is common to define the transmission characteristics of a fiber medium in terms of a total dispersion per unit length (typically per kilometer) and an average attenuation per unit length. Since these transmission characteristics are (particularly with respect to dispersion) wavelength dependent, values are normally provided for each of a range of different wavelengths.

In data communications networks with low transmission rates (e.g. less than 10 Gb/s), differences between the transmission characteristics of different fiber media do not impose serious limitations on network performance. In these systems, bit error rates are largely dependent on the communications equipment at each end of a fiber communications link. In such cases, substitution of one fiber medium having certain transmission characteristics with another fiber medium having slightly different transmission characteristics, typically will not have a major impact on the performance of the systems.

In the last decade however, transmission rates of data signals have increased dramatically. Simultaneously, the demand for ever-longer fiber spans between nodes and/or repeaters has increased. The result of these combined demands for higher data transmission rates and longer fiber spans has been a requirement for receivers with increased sensitivity. At high transmission rates, such as at 10–40 Gb/s, control of signal corruption introduced by channel effects is essential, because the transmission characteristics of a fiber have a critical bearing on the performance of the link. In order to optimize data transmission across any link, system parameters such as launched power level, peak power level, modulation shape, and wavelength plan (at both the transmitting and receiving ends of the link) need to be adjusted in accordance with the specific transmission characteristics of the fiber media through which the signal is propagated.

Manufacturers of fiber optic cables typically test the transmission characteristics of thier fiber media, either during or immediately following manufacture of the cable, and prior to delivery of the cable to a customer. Normally, this information is passed on to the customer as part of the cable delivery contract. However, operating companies often fail to maintain accurate records of the transmission characteristics of fibers that are installed in any particular cable. Companies merge, lease fiber and cables to other companies, records get lost, erroneous information gets entered into the records, and further errors occur in transferring information from the records to equipment in the field. On longer spans (up to 100 km or more) fibers having different transmission characteristics may be spliced in sequence, due to merged networks, or splicing errors. Some spans are formed using "dispersion managed cable" that contains fibers having differing transmission properties, deliberately spliced to each other in a particular sequence. As a result, the transmission properties of any particular fiber installed in a network are generally not known, even in cases where these transmission properties were determined by the manufacturer prior to delivery of the cable.

Normally, laboratory test instruments available for measuring dispersion are unsuitable for use with installed fiber, because they commonly require both ends of the fiber to be at the same location. Additionally, many test instruments cannot be used while a data signal is present at the same wavelength. The length of installed cables can only be very roughly determined from operating company records. More precise measurements of fiber length can be obtained from an optical time domain reflectometer temporarily attached to one end of the fiber (see IEEE Journal of Light Wave Technology, Volume 7, No. 8, August 1989, pages 1217–1224). However, optical communications systems, for example Wave Division Multiplexed (WDM) systems use photonic switching algorithms that can create dynamically varying fiber transmission paths. Such systems cannot rely upon slow and potentially inaccurate manual entry of the length and transmission characteristics of each of the fibers to which the system is connected.

Accordingly, there remains a need for a means by which an optical communications system can obtain an identification of a fiber media and/or automatically discover the transmission characteristics of optical fibers to which it is connected, and efficiently optimize one or more performance parameters in accordance with the identified transmission characteristics.

SUMMARY OF THE INVENTION

An object of the present invention is to provide an optical communications system capable of obtaining an identification of an optical fiber link, and adjusting one or more system parameters in accordance with predetermined optimum settings associated with the identification.

A further object of the present invention is to provide a an optical communications system capable automatically discovering fiber transmission properties of a fiber medium connected to the system, and adjusting one or more system parameters in accordance with predetermined optimum settings associated with the discovered fiber transmission properties.

Accordingly, an aspect of the present invention provides a method of optimizing one or more system parameters of an optical communications system adapted for connection to an optical fiber medium of an optical communications network; the method comprising the steps of: obtaining a class ID respecting the optical fiber medium; obtaining a respective optimum setting of each system parameter on a basis of the fiber identification; and adjusting a respective value of each system parameter in accordance with the respective optimum setting A further aspect of the present invention provides an apparatus for optimizing one or more system parameters of an optical communications system adapted for connection to an optical fiber medium of an optical communications network; the apparatus comprising: means for obtaining a class ID respecting the optical fiber medium; means for obtaining a respective optimum setting of each system parameter on a basis of the class ID; and means for adjusting a respective value of each system parameter in accordance with the respective optimum setting.

A still further aspect of the present invention provides optical communications system adapted for connection to an optical fiber medium of an optical communications network; the optical communications system comprising: a transceiver including a port connected for bi-directional communications through the optical fiber medium; a controller unit for controlling operation of the optical communications system, the controller unit being adapted to adjust one or more system parameters of the transceiver in accordance with predetermined properties of the optical fiber medium. The controller unit is further adapted to: obtain a class ID respecting the optical fiber medium; obtain a respective optimum setting of each system parameter, based on the class ID; and adjust a respective value of each system parameter in accordance with the corresponding optimum setting.

In an embodiment of the invention, the step of obtaining a class ID respecting the optical fiber medium comprises a step of receiving a fiber ID respecting the optical fiber medium. The fiber ID may manually entered into the optical communications system. Alternatively, the step of receiving a fiber ID can comprises the steps of: probing the optical output of a fiber for the presence of a Bragg grating; and if a Bragg grating is detected, reading information related to the fiber ID from the optical output of the Bragg grating. Preferably, the fiber ID is used to query a cross-reference table that includes a list of fiber ID's and a class ID associated with each fiber ID, to obtain the class ID respecting the optical fiber medium.

In embodiments of the invention, the step of obtaining a class ID comprises the steps of: discovering a value of at least one fiber transmission property of the optical fiber medium; providing a class definition table comprising a plurality of class definitions, each class definition including a respective class ID and at least one corresponding characteristic transmission property value; and selecting a class ID from the class definition table based on a closest match between corresponding ones of the at least one fiber transmission property value and the at least one characteristic transmission property value.

Each characteristic transmission property value preferably comprises a respective nominal value, and an allowable tolerance defining a value range of the characteristic transmission property. An alarm can be raised if any one fiber transmission property value does not lay within the value range of the corresponding characteristic transmission property, for any of the plurality of class definitions of the class definition table.

A value of at least one fiber transmission property can be obtained by testing the optical fiber link in situ, or alternatively prior to installation.

Preferably, the step of obtaining a value of at least one fiber transmission property comprises obtaining a respective value of any one or more of: a total optical signal dispersion; a zero dispersion wavelength; an average optical signal attenuation; a length of the fiber; a total dispersion per unit length of the fiber; and an average attenuation per unit length of the fiber.

The at least one characteristic transmission property value preferably comprises a respective value of any one or more of: the zero dispersion wavelength; the total dispersion per unit length of the fiber; and the average attenuation per unit length of the fiber. Still more preferably, the at least one characteristic transmission property value comprises a respective value of each one of the zero dispersion wavelength and the total dispersion per unit length of the fiber.

In embodiments of the invention, the step of selecting a class ID comprises the steps of: comparing each respective fiber transmission property value to a corresponding characteristic transmission property value within each class definition of the class definition table; and selecting the class ID of a one of the plurality of class definitions for which each characteristic transmission property value most closely matches a corresponding fiber transmission property value.

In embodiments of the invention, the step of obtaining a respective optimum setting of each system parameter comprises a step of searching a system table comprising a plurality of system definitions, each system definition including a respective class ID and a corresponding optimum setting for each parameter. Preferably, all of the system definitions of the system table pertain to a predetermined set of one or more related optical communications systems.

The one or more system parameters may comprise any one or more of: a transmission wavelength; a signal power; and a received signal detection threshold.

In embodiments of the invention, the step of adjusting a respective value of each system parameter comprises a step of adjusting a transmission wavelength of one or more lasers of the optical communications system. The transmission wavelength of each laser is preferably adjusted independently, and may be accomplished by tuning or by means of one or more filters.

In embodiments of the invention, the step of adjusting a respective value of each system parameter comprises a step of adjusting a signal power of one or more lasers of the optical communications system. The signal power of each laser is preferably adjusted independently.

In embodiments of the invention, the step of adjusting a respective value of each system parameter comprises a step of adjusting a detection threshold of one or more optical signal detectors of the optical communications system. The detection threshold of each optical signal detector is preferably adjusted independently.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
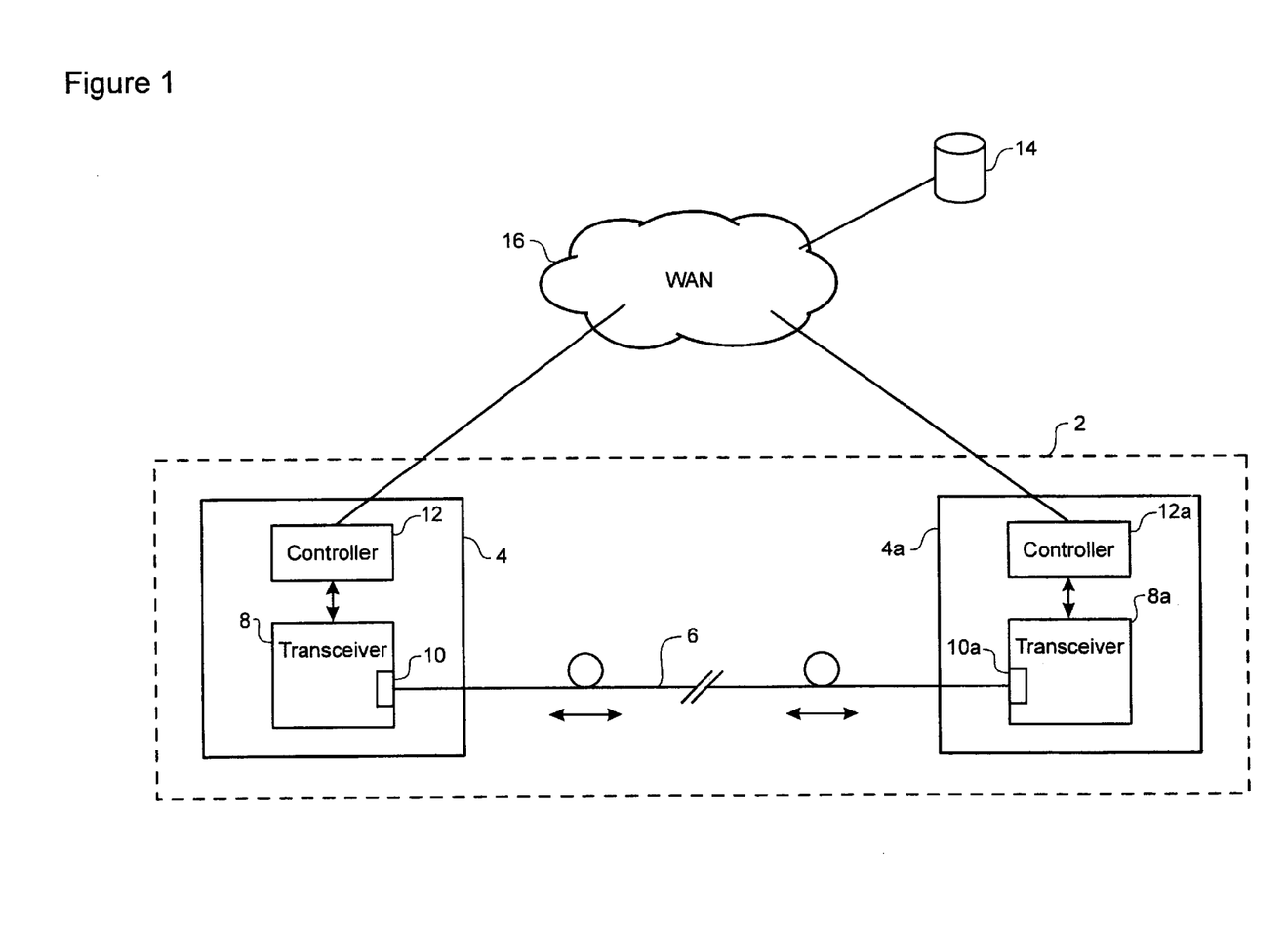
FIG. 1 is a block diagram schematically illustrating an optical communications system in accordance with an embodiment of the present invention.

As shown in FIG. 1, a data communications network 2 comprises a number (two in the illustrated embodiment) of optical communications systems 4, 4a interconnected by a bi-directional optical fiber link 6. Each optical communications system 4 includes a respective transiever unit 8 having port 10 connected to the optical fiber link 6 for sending and receiving incoming optical data signals; and a controller unit 12 for controlling operations of the optical communications system 4. A fiber class database 14 stores information used to facilitate identification of the optical fiber link 6 and optimization of system parameters, as will be described in greater detail below. The fiber class database 14 may be directly connected to each control unit 12, or may be resident at a remote location and connected for remote access through a Wide Area Network (WAN) 16 as shown in FIG. 1.

Figure 2:
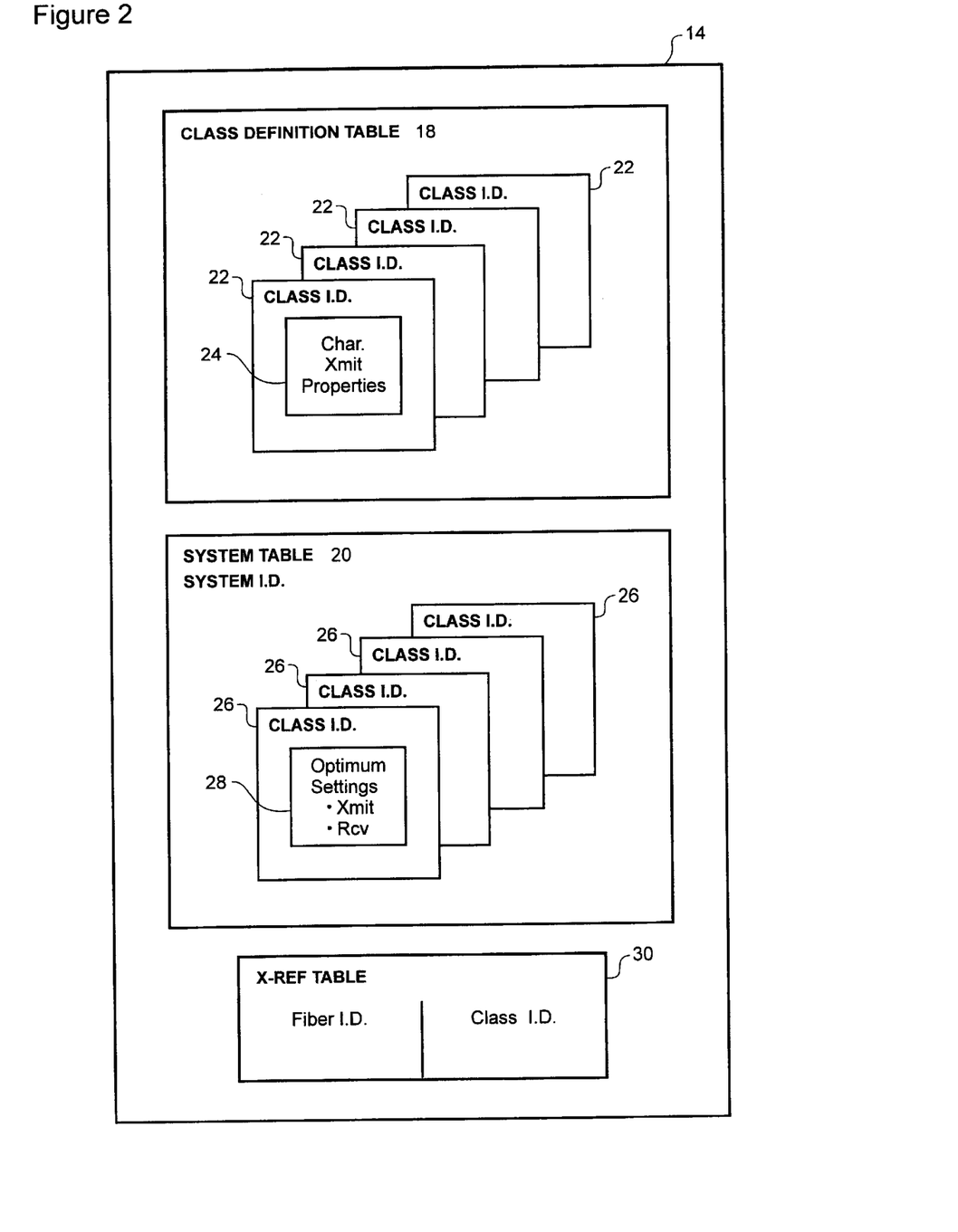
FIG. 2 is a block diagram schematically illustrating a fiber class database usable in the embodiment of FIG. 1.

As shown in FIG. 2 the fiber class database 14 preferably includes a class definition table 18, and a system table 20. The class definition table 18 comprises a respective plurality of class definitions 22. Each class definition 22 includes a unique class ID, and a characteristic transmission properties block 24. The system table 20 comprises a respective plurality of system definitions 26, all of which are related to a specific type (or model) of optical communications system 4. Thus, in the illustrated embodiment, the fiber class database 14 will contain one system table 20 for each type of optical communications system 4 installed on the network 2. Each system definition 26 includes a unique class ID which corresponds with a class ID of a respective class definition 22, and an optimum settings block 28 which includes optimum system parameter values of the optical communications system 4 for the respective class definition 22.

Using the above arrangement, related class definitions 22 and system definitions 26 are linked by means of the class ID's. Thus, once the class ID is known for a particular fiber media, the optical communications system 4 can query its respective system table 20 to obtain the optimum system parameter settings for that fiber media.

In the illustrated embodiment, the fiber class database 14 includes a single class definition table 18. However, it is equally possible to organize the fiber class database 14 with two (or more) class definition tables 18. The use of plural class definition tables 18 may be particularly advantageous because characteristic transmission properties data of any particular fiber media may well be considered proprietary by the manufacturer of the fiber media. By separating the fiber class database 14 into multiple class definition tables 18 (each of which may be separately maintained and interconnected via the WAN 16) each manufacturer of fiber media is enabled to maintain a respective class definition table 18 specific to their product, and these tables may be maintained separately from those of their competitors. Common agreement between each of these manufacturers in respect of class definitions and corresponding class IDs ensures that the control unit 12 of any specific optical communications system 4 installed on the network 2 can query the database 14 to obtain data necessary to enable optimization of system parameters.

Similarly, the illustration of FIG. 2 shows a single system table 20, However, it will be appreciated that the database 14 would normally include a plurality of system tables 20, each table corresponding to a specific type of optical communications system 4 (or product line). As in the case of the class definitions, this arrangement enables each manufacturer of optical communications systems to maintain a respective system tables 20 specific to their product line, and these tables may be maintained separately from those of their competitors. Common agreement between each of these manufacturers in respect of system definitions and class IDs ensures that the control unit 12 of any specific optical communications system 4 installed on the network 2 can query the database 14 to obtain data necessary to enable optimization of system parameters.

FIG. 2 shows an optional cross-reference table 30 included in the database 14. While not an essential feature of the present invention, the inclusion of a cross-reference table 30 is advantageous in that a manufacturer may find it convenient or desirable to provide a fiber ID (e.g. analogous to a product serial number), rather than disclose a class ID for a fiber product, which would release information of the performance of that fiber to competitors. A cross-reference table 30 permits the fiber manufacturer to identify individual fibers (or all fibers within a cable), for example by color-coding or otherwise printing information on an exterior jacket of the fiber or cable. This fiber ID information can then be entered into the controller 12 (e.g. by a service technician) and used to obtain the appropriate class ID by querying the cross-reference table 30.

As mentioned previously and shown in FIG. 3, each class definition 22 includes a unique class identifier and a characteristic transmission properties block 24. Each class definition 22 relates to a corresponding class or type of fiber medium. In principle, each class definition 22 may relate to a single fiber media product. More usually, however, each class definition 22 will relate to a set of fiber media products having closely similar optical transmission properties. In this context, fiber media are classified according to their optical transmission properties, as opposed to other known criteria (e.g. material composition or manufacturing methodology). Thus the characteristic transmission properties block 24 preferably contains data which uniquely characterizes a specific class or type of fiber medium. In the illustrated embodiment, these transmission properties include: the zero dispersion wavelength; average attenuation per kilometer; and the total dispersion per kilometer. Other characteristic properties may be used in addition to (or in place of) those listed in FIG. 3. Preferably, data for each of these parameters is provided in the form of a nominal value, and a tolerance delineating a value range (about the nominal value) within which every member of the respective fiber class lays. It is possible that, for any specific characteristic transmission property, the value range specified in respect of a class definition 22 may overlap that of another class definition 22. However, taken as a group, the value ranges of all of the transmission properties comprising the characteristic transmission properties block 24 will uniquely define each class definition 22. Additionally, at least the data of a total dispersion per kilometer is preferably provided as a table containing, respective nominal and tolerance values for the total dispersion per kilometer for each of a plurality of wavelengths across a predetermined optical spectrum.

As mentioned previously, it is desirable to adjust communication system parameters such as launch power level, peak power level, modulation shape, and wavelength plan in accordance with the specific transmission characteristics of the fiber media through which an optical signal is to be propagated. For a known set of characteristic transmission properties, it is possible to define a respective set of optimum settings for each of the system parameters of a particular optical communications system 4. These data are saved in the optimum settings block 28 of the system definition 20.

Figure 3:
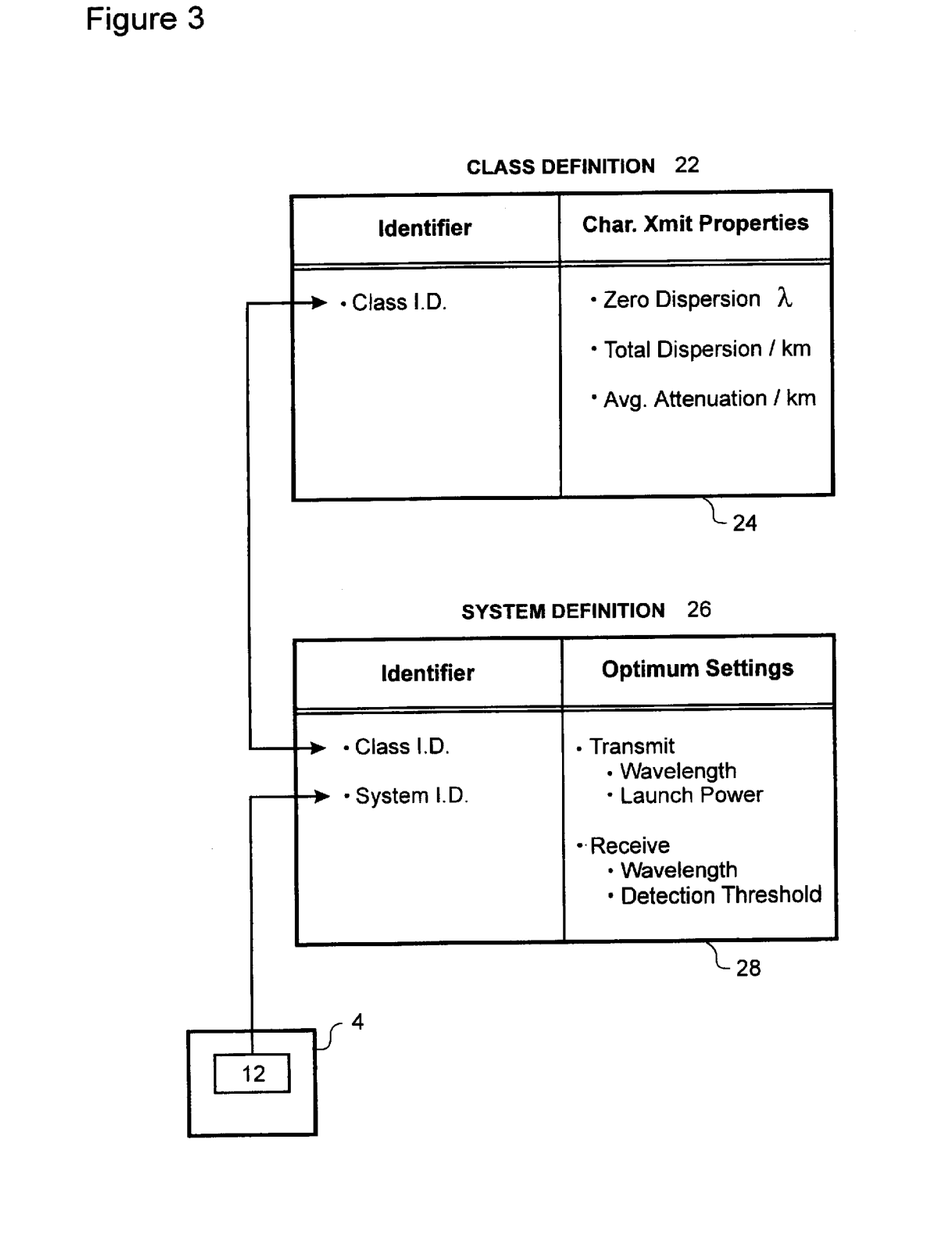
FIG. 3 is a block diagram schematically illustrating elements of an exemplary class definition of the fiber class database of FIG. 2.

As shown in FIG. 3, the optimum settings block 28 may contain optimum setting values concerning either one or both of the transmitter and the receiver portions of the transiever 8 of the optical communications system 4. As mentioned above, these data will necessarily be specific to the make and model of the optical communication system 4 and thus will normally be provided by the manufacturer of that system. It is implicit that optimum parameter values will, for any given class definition 20, be different for each member of a particular product line, and will be different between differing system manufacturers. This situation can be readily handled using the distributed database 14 as described above.

Figure 4:
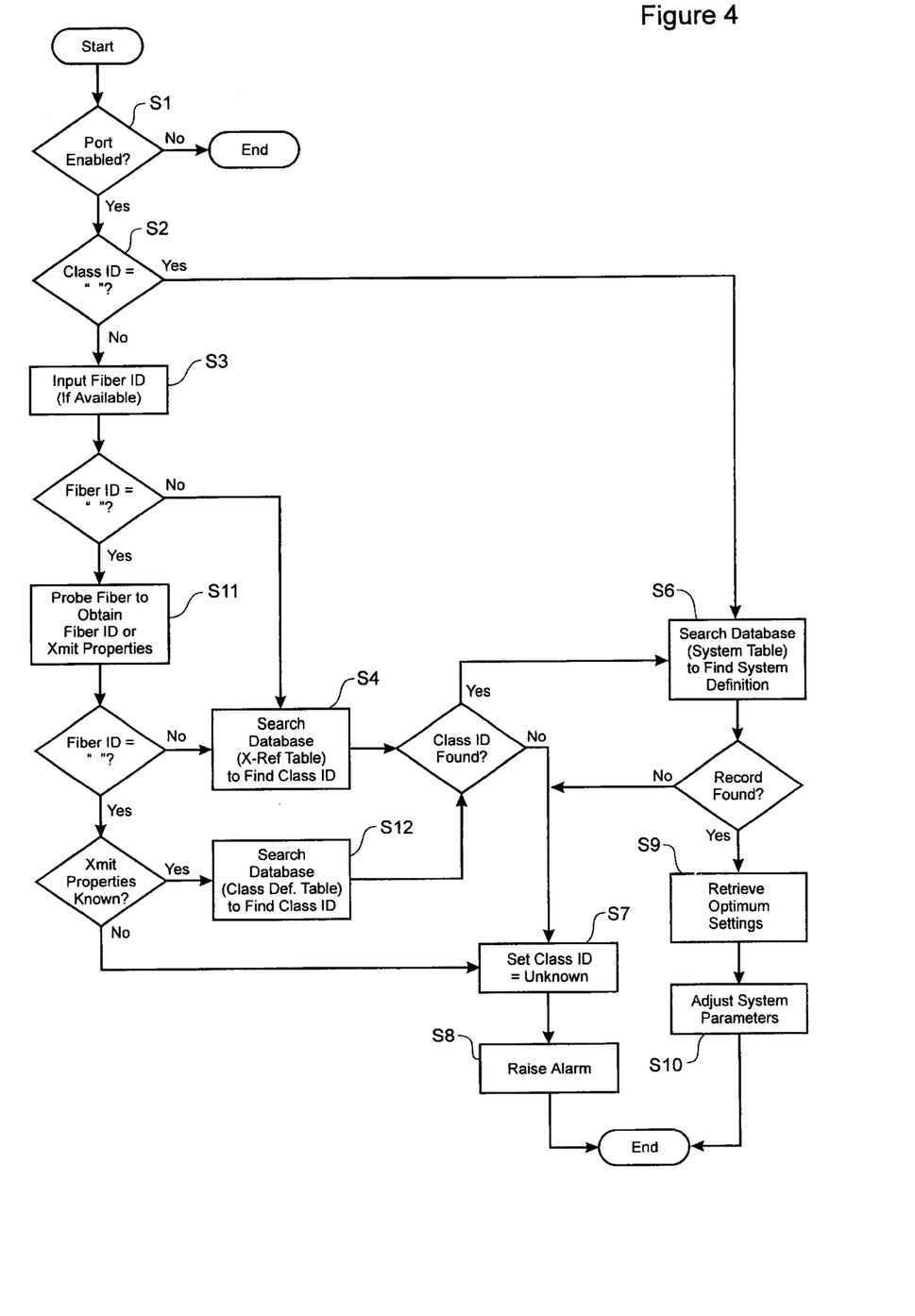
FIG. 4 is a flow chart illustrating an exemplary process of identifying an optical fiber and optimizing system parameters in accordance with an embodiment of the present invention.

FIG. 4 is a flow chart showing an exemplary process of optimizing system parameters in accordance with an embodiment of the present invention. The process illustrated in FIG. 4 is assumed to be automatically initiated on power-up of the system following installation of the system or connection of a fiber to a port 10, for example by a service technician. Steps in this process are as follows:

At a step S1 the controller 12 of the optical communications system 4 probes a port 10 to determine whether the port 10 has become enabled. If the result of step S1 is NO, the process terminates in respect of the port 10. Otherwise, the controller 12 determines (step S2) whether a class ID has been provided (e.g. previously stored in a memory, or identified by DIP-switches). If no class ID has been provided, the controller 12 may optionally prompt the technician to enter a fiber ID (step S3), if such information is available. If a valid fiber ID is entered at step S3, the controller 12 uses this data to query the cross-reference table 30 of the database 14 to obtain the class ID (step S4). If the database 14 returns a valid class ID, the controller 12 the uses the class ID to query the system table 20 of the database 14 to obtain the applicable system definition 26 (step S5). If the database 14 fails to return a valid class ID at Step S4, or if it fails to locate an appropriate system definition 26 at step S5, then the controller 12 sets the class ID to "unknown" (step S7) and raises an alarm (step S8) before terminating the process.

On the other hand, if the database 14 successfully locates an appropriate system definition 26 at step S5, then the controller 12 retrieves the optimum parameter values from the optimum settings block 28 of the returned system definition 26 (step S9), and then uses these data to adjust its operating parameters in respect of the selected port 10 (step S10). Known methods (e.g. as described in U.S. Pat. No. 5,969,840) can be used to control the power of the peak optical wavelength to an optimum level as defined in the optimum settings block 28. The wavelengths of tunable lasers used in a WDM system can be then selected to produce the optimum wavelength plan for the optical medium. If WDM filters are not flexible enough via free spectral range or tunability, this might entail a step of manually changing filters. The launch powers of each laser can be similarly optimized, again based on the data provided in the optimum settings block 28.

If at step S3 a technician does not enter a valid fiber ID, the controller 12 can probe the fiber (at step S11) to obtain either one or both of the fiber ID and a set of fiber transmission properties. Exemplary steps in the process of probing the fiber are described below with reference to FIGS. 5a and 5b.

If, as a result of probing the fiber at step S11, the controller 12 locates a fiber ID, then the controller proceeds through steps S4–S10 as described above. Alternatively, if controller 12 obtains a set of fiber transmission properties at step S11, then the controller 12 uses the fiber transmission properties to query the class definition table 18 of the database 14 to obtain the class ID (step S12). Known comparison techniques (e.g. vector matching) may be used by the database 14 to locate an best match class definition 22. Thus the fiber medium 6 can be considered to be a member of the fiber class for which the corresponding characteristic transmission properties most closely match the fiber transmission properties obtained at step S11. Based on the closest match between obtained fiber transmission properties and the characteristic transmission properties 24, a corresponding class ID of the class definition 22 can be assigned to the specific fiber media 6 connected to the optical communications system 4. The controller 12 can then use the assigned class ID query the system table 20 and obtain optimum settings for adjusting the system parameters as described above (steps S6–S10).

On the other hand, if it is determined that a value of a fiber transmission property obtained at step S11 lies outside of the value range of the corresponding characteristic transmission property for any class definition 22 (including the closest match class definition 22), then the database 14 will fail to return a valid class ID at step S12. In this case, the controller 12 sets the class ID to "unknown" (step S7) and raises an alarm (step S8) to alert service personnel before terminating.

Figure 5A:
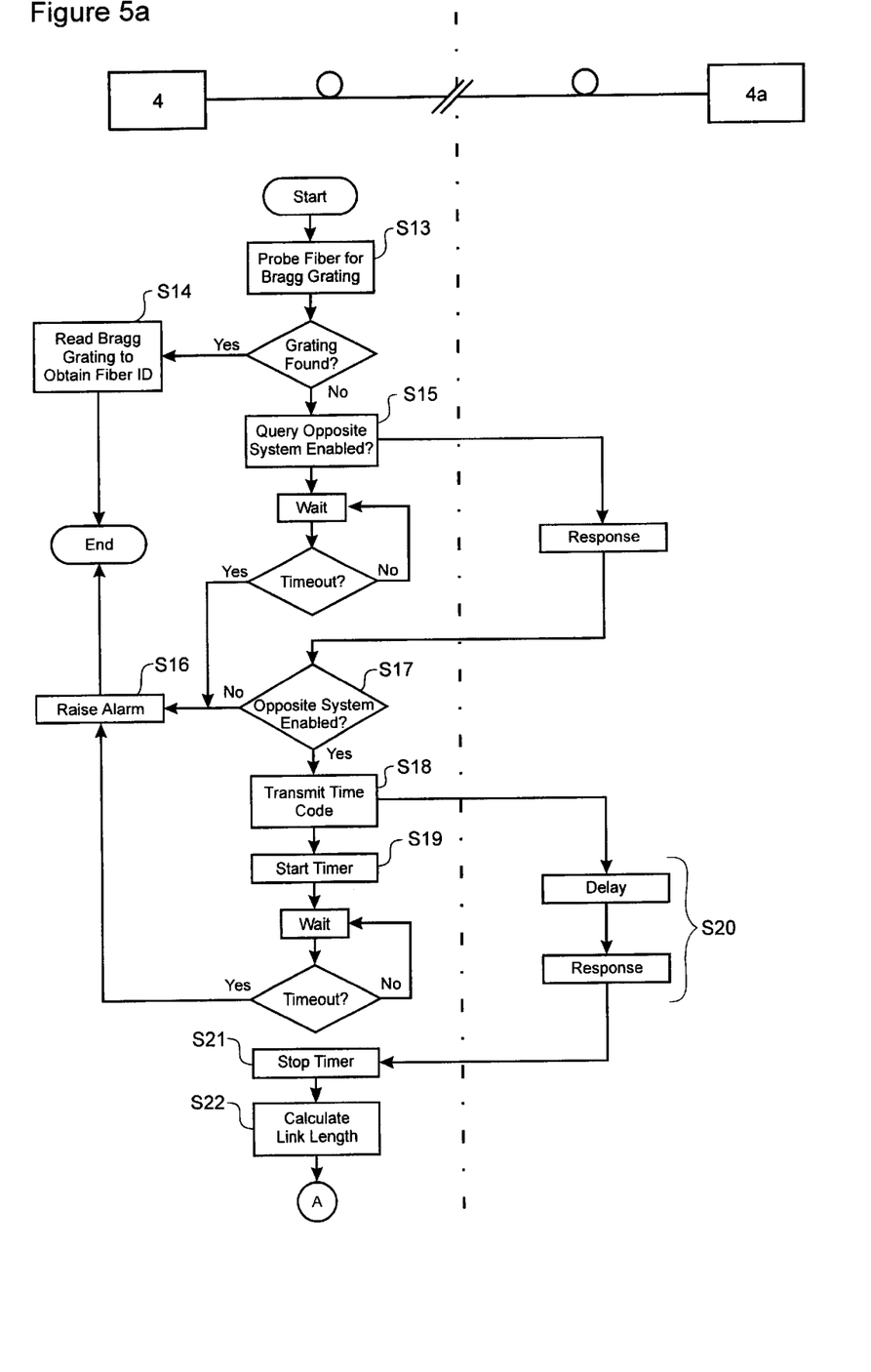
FIGS. 5a and 5b are a flow chart illustrating an exemplary process of probing a fiber communications link to obtain fiber transmission properties of the fiber media.
Figure 5B:
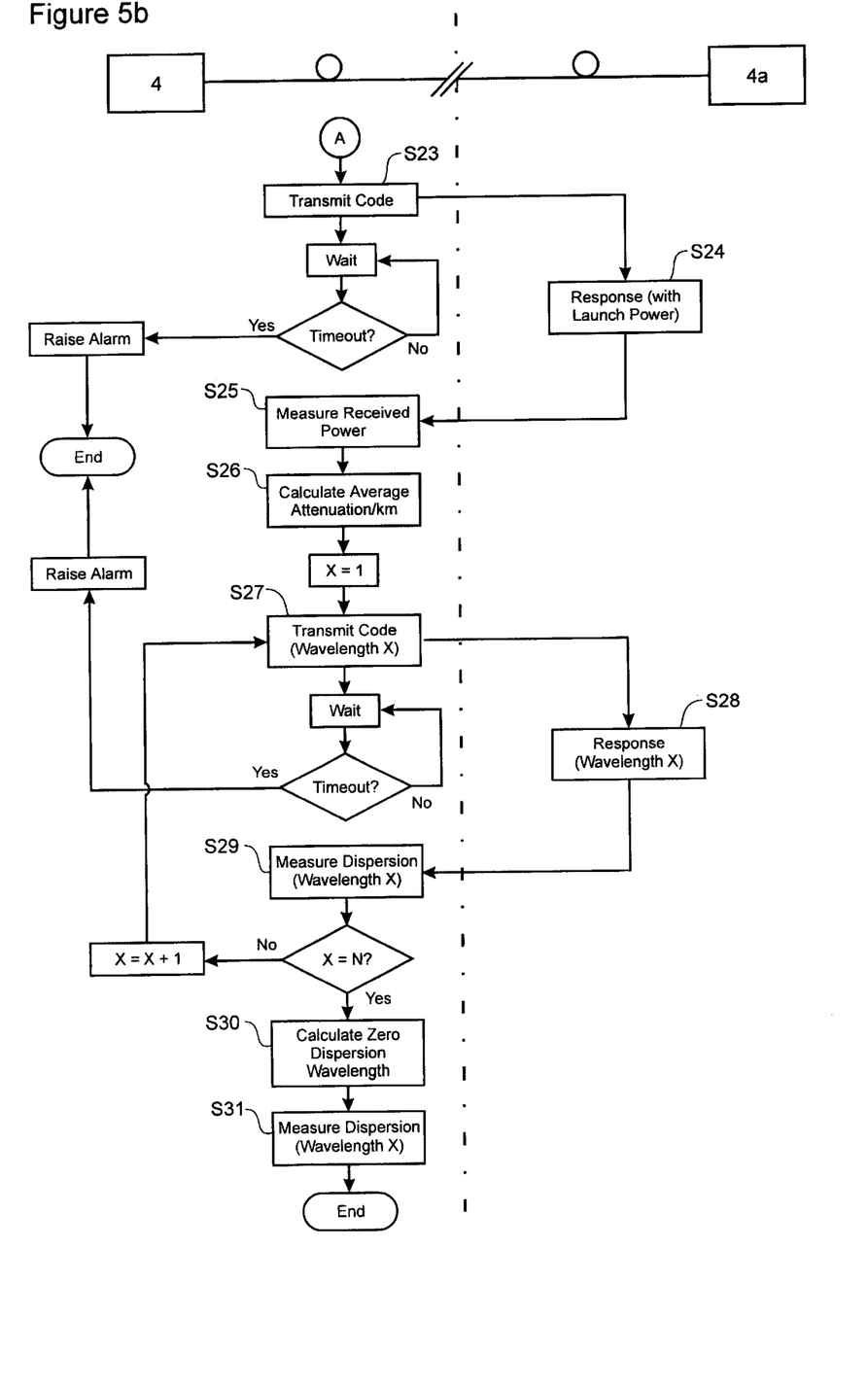

As mentioned above, at step S11 the controller 12 an obtain either one or both of the fiber ID and a set of fiber transmission properties by probing the fiber media 6. FIGS. 5a and 5b show exemplary steps in this process.

As shown in FIG. 5, at a step S13, the controller 12 can probe the fiber to detect the presence of a predetermined marker. An example of such a marker is a weak Bragg grating induced into the fiber by the manufacturer, and encoding data concerning the fiber (e.g. the fiber ID) without unduly affecting traffic carrying signals. Such a Bragg grating can be read at a distance of up to 5 km (or more), and thus need not be located near the optical communications system 4. If a marker is detected at step S13, the controller 12 proceeds to read the fiber ID (at step S14) before terminating.

If a marker (Bragg grating) is not detected at step S13, the controller 12 can probe the fiber medium 6 and estimate its transmission properties to within an acceptable degree of accuracy. Known methods for accomplishing this result require that the optical communications system 4a at the opposite end of the fiber 6 be enabled to cooperate with the controller 12. Thus at step S15, the controller 12 sends a query to the opposite system 4a to determine whether or not it is enabled for fiber identification. If no response is received before a predetermined timeout, the controller 12 raises an alarm (step S16) and terminates the process. On the other hand, if the opposite system 4a returns a valid response (step S17), then the controller begins probing the fiber link 6 to determine its transmission properties.

The length of the fiber link 6 can be determined by sending a query message with a predetermined time code to the opposite system 4a (step S18). The controller 12 then starts a timer (step S19). Upon receipt of the query message, the opposite system 4a prepares and sends a predetermined response at a known delay (step S20). If the response message is received before a predetermined timeout, then the controller 12 stops the timer (step S21) so that the timer records the elapsed time from sending out the first time identifying symbol to receipt of the response. The controller 12 subtracts the known delay from the round trip delay; divides the result by two to obtain the unidirectional propagation delay through the fiber 6; and then multiplies the unidirectional propagation delay by the speed of light in fiber to obtain the length of the fiber (step S22).

As shown in FIG. 5a, the average attenuation can be determined by transmitting a signal having a given launch power, and then detecting the received signal power at the opposite end of the link 6. In the illustrated embodiment, this is accomplished by sending a trigger message to the opposite system 4a (step S23). The opposite system 4a responds by sending a response message at a predetermined launch power (step S24). Preferably, the response message includes data of the launch power used by the opposite system 4a to send the response message. If the controller 12 receives the response message prior to a predetermined timeout, it measures the received signal power (step S25) and then calculates the total span attenuation by subtracting the launch power from the received power. Using known methods (e.g. as described in UK Patent Publication No. GB2292495, published Feb. 21, 1996), discrete losses in the optical path can be determined. Subtracting these discrete losses from the total span attenuation, and then dividing the result by the measured span length yields the average fiber loss in dB/km (step S26).

Where the optical communications system 2 is a wave division multiplex (WDM) system, methods are known by which the dispersion at one or more wavelengths can be determined. In the illustrated embodiment, this is accomplished by sending a trigger message to the opposite system 4a (step S27). The opposite system 4a responds by sending a response message at a predetermined wavelength (step S28). Preferably, the response message includes data respecting the wavelength used by the opposite system 4a to send the response message. If the controller 12 receives the response message prior to a predetermined timeout, the signal dispersion can be measured (step S29) using known techniques (e.g. as described in Canadian Patent Application No. 2,207,126 published Dec. 7, 1997). This processes (steps S27–S29) is repeated for each of N wavelengths. With the knowledge of the dispersion at a number of wavelengths, the dispersion slope and the wavelength of zero dispersion can be calculated for that fiber span (step S30). The total dispersion measurement, at each wavelength, divided by the length of the fiber span yields the dispersion per kilometer of fiber (step S31).

The total dispersion in some fibers, such as non-dispersion shifted fiber, can be identified by a measurement at one or two wavelengths. More complex combinations of fibers or more complex fiber designs will require measurements at a larger number of wavelengths in order to characterize the dispersion of that fiber span.

A transition between fiber types can be determined by measuring mode field diameter changes by bi-directional reflectometry. This uses known methods such as those disclosed in British Patent Publication No. GB2292495 published Feb. 21 1996.

The embodiment(s) of the invention described above is(are) intended to be exemplary only. The scope of the invention is therefore intended to be limited solely by the scope of the appended claims.

We claim:

1. A method of optimizing one or more system parameters of an optical communications system adapted for connection to an optical fiber medium of an optical communications network; the method comprising the steps of:
   a) obtaining a class ID respecting the optical fiber medium;
   b) obtaining a respective optimum setting of each system parameter on a basis of the fiber identification; and
   c) adjusting a respective value of each system parameter in accordance with the respective optimum setting.

2. A method as claimed in claim 1, wherein the step of obtaining a class ID respecting the optical fiber medium comprises a step of receiving a fiber ID respecting the optical fiber medium.

3. A method as claimed in claim 2, wherein the fiber ID is manually entered into the optical communications system.

4. A method as claimed in claim 2, wherein the step of receiving a fiber ID comprises the steps of: probing the optical fiber medium for the presence of a predetermined marking containing information of the fiber ID; and if a marking is detected, reading information of the fiber ID from the marking.

5. A method as claimed in claim 4, wherein the predetermined marking is a Bragg grating.

6. A method as claimed in claim 2, further comprising a step of using the fiber ID to query a cross-reference table comprising a list of fiber ID's and a class ID associated with each fiber ID, to obtain the class ID respecting the optical fiber medium.

7. A method as claimed in claim 1, wherein the step of obtaining a class ID comprises the steps of:
   a) discovering a value of at least one fiber transmission property of the optical fiber medium;
   b) providing a class definition table comprising a plurality of class definitions, each class definition including at least:
      i) a respective class ID; and
      ii) at least one corresponding characteristic transmission property value;
   c) selecting a class ID from the class definition table based on a closest match between corresponding ones of the at least one fiber transmission property value and the at least one characteristic transmission property value.

8. A method as claimed in claim 7, wherein each characteristic transmission property value comprises a respective nominal value, and an allowable tolerance defining a value range of the characteristic transmission property.

9. A method as claimed in claim 8, further comprising a step of raising an alarm if any one fiber transmission property value does not lay within the value range of the corresponding characteristic transmission property, for any of the plurality of class definitions of the class definition table.

10. A method as claimed in claim 7, wherein the step of obtaining a value of at least one fiber transmission property comprises a step of testing the optical fiber link in situ.

11. A method as claimed in claim 7, wherein the step of obtaining a value of at least one fiber transmission property comprises a step of testing the optical fiber link prior to installation.

12. A method as claimed in claim 7, wherein the step of obtaining a value of at least one fiber transmission property comprises obtaining a respective value of any one or more of: a total optical signal dispersion; a zero dispersion wavelength; an average optical signal attenuation; a length of the fiber; a total dispersion per unit length of the fiber; and an average attenuation per unit length of the fiber.

13. A method as claimed in claim 12, wherein the at least one characteristic transmission property value comprises a respective value of any one or more of: the zero dispersion wavelength; the total dispersion per unit length of the fiber; and the average attenuation per unit length of the fiber.

14. A method as claimed in claim 13, wherein the at least one characteristic transmission property value comprises a respective value of each one of the zero dispersion wavelength and the total dispersion per unit length of the fiber.

15. A method as claimed in claim 7, wherein the step of selecting a class ID comprises the steps of:
   a) comparing each respective fiber transmission property value to a corresponding characteristic transmission property value within each class definition of the class definition table; and
   b) selecting the class ID of a one of the plurality of class definitions for which each characteristic transmission property value most closely matches a corresponding fiber transmission property value.

16. A method as claimed in claim 1, wherein the step of obtaining a respective optimum setting of each system parameter comprises a step of searching a system table comprising a plurality of system definitions, each system definition including a respective class ID and a corresponding optimum setting for each parameter.

17. A method as claimed in claim 16, wherein all of the system definitions of the system table pertain to a predetermined set of one or more related optical communications systems.

18. A method as claimed in claim 16, wherein the one or more system parameters comprises any one or more of: a transmission wavelength; a signal power; and a received signal detection threshold.

19. A method as claimed in claim 18, wherein the step of adjusting a respective value of each system parameter comprises a step of adjusting a transmission wavelength of one or more lasers of the optical communications system.

20. A method as claimed in claim 19, wherein the transmission wavelength of each laser is adjusted independently.

21. A method as claimed in claim 19, wherein the transmission wavelength is adjusted by tuning.

22. A method as claimed in claim 19, wherein the transmission wavelength is adjusted by means of one or more filters.

23. A method as claimed in claim 18, wherein the step of adjusting a respective value of each system parameter comprises a step of adjusting a signal power of one or more lasers of the optical communications system.

24. A method as claimed in claim 23, wherein the signal power of each laser is adjusted independently.

25. A method as claimed in claim 23, wherein the detection threshold of each optical signal detector is adjusted independently.

26. A method as claimed in claim 18, wherein the step of adjusting a respective value of each system parameter comprises a step of adjusting a detection threshold of one or more optical signal detectors of the optical communications system.

27. An apparatus for optimizing one or more system parameters of an optical communications system adapted for connection to an optical fiber medium of an optical communications network; the apparatus comprising:
   a) means for obtaining a class ID respecting the optical fiber medium;
   b) means for obtaining a respective optimum setting of each system parameter on a basis of the class ID; and
   c) means for adjusting a respective value of each system parameter in accordance with the respective optimum setting.

28. An apparatus as claimed in claim 27, wherein the means for obtaining a class ID respecting the optical fiber medium comprises means for of receiving a fiber ID respecting the optical fiber medium.

29. An apparatus as claimed in claim 28, wherein the fiber ID is manually entered into the optical communications system.

30. An apparatus as claimed in claim 28, wherein the means for receiving a fiber ID comprises means for: probing the optical fiber medium for the presence of a predetermined marking containing information of the fiber ID; and if a marking is detected, reading information of the fiber ID from the marking.

31. An apparatus as claimed in claim 30, wherein the predetermined marking is a Bragg grating.

32. An apparatus as claimed in claim 28, further comprising:
   a) a cross-reference table comprising a list of fiber ID's and a class ID associated with each fiber ID; and
   b) means for using the fiber ID to obtain the class ID by querying the cross-reference table.

33. An apparatus as claimed in claim 27, wherein the step of obtaining a class ID comprises:
   a) means for discovering a value of at least one fiber transmission property of the optical fiber link;
   b) a class definition table comprising a plurality of class definitions, each class definition including at least:
      i) a respective class In; and
      ii) at least one corresponding characteristic transmission property value; and
   c) means for selecting a class ID from the class definition table based on a closest match between corresponding ones of the at least one fiber transmission property value and the at least one characteristic transmission property value.

34. An apparatus as claimed in claim 33, wherein each characteristic transmission property value comprises a respective nominal value, and an allowable tolerance defining a value range of the characteristic transmission property.

35. An apparatus as claimed in claim 34, further comprising means for raising an alarm if any one fiber transmission property value does not lay within the value range of the corresponding characteristic transmission property, for any of the plurality of class definitions of the class definition table.

36. An apparatus as claimed in claim 33, wherein the means for discovering a value of at least one fiber transmission property comprises a step of testing the optical fiber link in situ.

37. An apparatus as claimed in claim 33, wherein the means for discovering a value of at least one fiber transmission property comprises means for discovering a respective value of any one or more of, a total optical signal dispersion; a zero dispersion wavelength; an average optical signal attenuation; a length of the fiber; a total dispersion per unit length of the fiber; and an average attenuation per unit length of the fiber.

38. An apparatus as claimed in claim 37, wherein the at least one characteristic transmission property value comprises a respective value of any one or more of: the zero dispersion wavelength; the total dispersion per unit length of the fiber; and the average attenuation per unit length of the fiber.

39. An apparatus as claimed in claim 38, wherein the at least one characteristic transmission property value comprises a respective value of each one of the zero dispersion wavelength and the total dispersion per unit length of the fiber.

40. An apparatus as claimed in claim 33, wherein the means for selecting a class ID comprises:
   a) means for comparing each respective fiber transmission property value to a corresponding characteristic transmission property value within each class definition of the class definition table; and
   b) means for selecting the class ID of a one of the plurality of class definitions for which each characteristic transmission property value most closely matches a corresponding fiber transmission property value.

41. An apparatus as claimed in claim 27, wherein the means for obtaining a respective optimum setting of each parameter comprises means for searching a system table comprising a plurality of system definitions, each system definition including a respective class ID and a corresponding optimum setting for each parameter.

42. An apparatus as claimed in claim 41, wherein each of the system definitions of the system table pertain to a predetermined set of one or more related optical communications systems.

43. An apparatus as claimed in claim 41, wherein the one or more parameters comprises any one or more of: a transmission wavelength; a signal power; and a signal detection threshold.

44. An apparatus as claimed in claim 43, wherein the means for adjusting a respective value of each parameter comprises means for adjusting a transmission wavelength of one or more lasers of the optical communications system.

45. An apparatus as claimed in claim 44, wherein the means for adjusting a transmission wavelength of each laser is adapted to adjust each laser independently.

46. An apparatus as claimed in claim 44, wherein the means for adjusting a transmission wavelength of each laser is adapted to adjust each laser by tuning.

47. An apparatus as claimed in claim 43, wherein the means for adjusting a respective value of each system parameter comprises means for adjusting a signal power of one or more lasers of the optical communications system.

48. An apparatus as claimed in claim 47, wherein the means for adjusting the signal power of each laser is adapted to adjust the signal power of each laser independently.

49. An apparatus as claimed in claim 43, wherein the means for adjusting a respective value of each system parameter comprises means for adjusting a detection threshold of one or more optical signal detectors of the optical communications system.

50. An apparatus as claimed in claim 49, wherein the means for adjusting the detection threshold of each optical signal detector is adapted to adjust the detection threshold of each optical signal detector independently.

51. An optical communications system adapted for connection to an optical fiber medium of an optical communications network, the optical communications system comprising:
   a) a transceiver including a port connected for bi-directional communications through the optical fiber medium;
   b) a controller unit for controlling operation of the optical communications system, the controller unit being adapted to:
      i) obtain a class ID respecting the optical fiber medium;
      ii) obtain a respective optimum setting of each system parameter, based on the class ID; and
      iii) adjust a respective value of each system parameter in accordance with the corresponding optimum setting.

52. A system as claimed in claim 51, wherein the class ID comprises a fiber ID respecting the optical fiber medium.

53. A system as claimed in claim 52, wherein the fiber ID is manually entered into the optical communications system.

54. A system as claimed in claim 52, wherein the controller is adapted to: control the transceiver to probe the optical fiber medium for the presence of a predetermined marking containing information of the fiber ID; and if a marking is detected, read information of the fiber ID from the marking.

55. An apparatus as claimed in claim 54, wherein the predetermined marking is a Bragg grating.

56. A system as claimed in claim 52, wherein the controller is further adapted to use the fiber ID to query a cross-reference table comprising a list of fiber ID's and a class ID associated with each fiber ID, to obtain the class ID respecting the optical fiber medium.

57. A system as claimed in claim 51, wherein the controller is adapted to obtain a class ID by:
   a) discovering a value of at least one fiber transmission property of the optical fiber medium;
   b) searching a class definition table comprising a plurality of class definitions, each class definition including at least:
      i) a respective class ID; and
      ii) at least one corresponding characteristic transmission property value; and
   c) selecting a class ID from the class definition table based on a closest match between corresponding ones of the at least one fiber transmission property value and the at least one characteristic transmission property value.

58. A system as claimed in claim 57, wherein each characteristic transmission property value comprises a respective nominal value, and an allowable tolerance defining a value range of the characteristic transmission property.

59. A system as claimed in claim 58, wherein the controller is further adapted to raise an alarm if any one fiber transmission property value does not lay within the value range of the corresponding characteristic transmission property, for any of the plurality of class definitions of the class definition table.

60. A system as claimed in claim 57, wherein the at least one fiber transmission property comprises any one or more of: a total optical signal dispersion; a zero dispersion wavelength; an average optical signal attenuation; a length of the fiber; a total dispersion per unit length of the fiber; and an average attenuation per unit length of the fiber.

61. A system as claimed in claim 60, wherein the at least one characteristic transmission property value comprises a respective value of any one or more of: the zero dispersion wavelength; the total dispersion per unit length of the fiber; and the average attenuation per unit length of the fiber.

62. A system as claimed in claim 61, wherein the at least one characteristic transmission property value comprises a respective value of each one of the zero dispersion wavelength and the total dispersion per unit length of the fiber.

63. A system as claimed in claim 57, wherein the controller is adapted to select a class ID by:

a) comparing each respective fiber transmission property value to a corresponding characteristic transmission property value within each class definition of the class definition table; and b) selecting the class ID of a one of the plurality of class definitions for which each characteristic transmission property value most closely matches a corresponding fiber transmission property value.

64. A system as claimed in claim 51, wherein the controller is adapted to obtain a respective optimum setting of each system parameter by searching a system table comprising a plurality of system definitions, each system definition including a respective class ID and a corresponding optimum setting for each system parameter.

65. A system as claimed in claim 64, wherein all of the system definitions of the system table pertain to a predetermined set of one or more related optical communications systems.

66. A system as claimed in claim 64, wherein the one or more system parameters comprises any one or more of: a transmission wavelength; a signal power; and a received signal detection threshold.

* * * * *